Aug. 2, 1949.  E. R. McMORRIS  2,477,759
BATTERY CORROSION ELIMINATOR
Filed Sept. 14, 1945
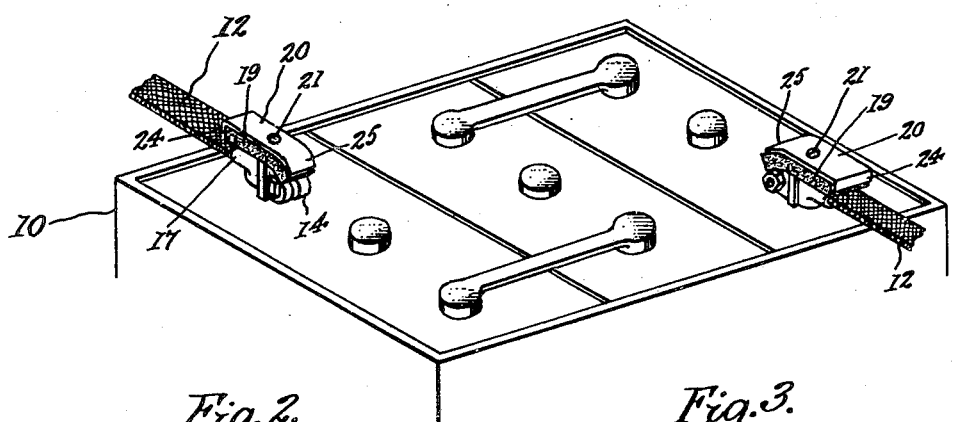
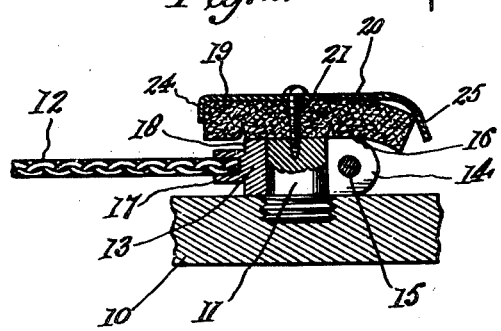
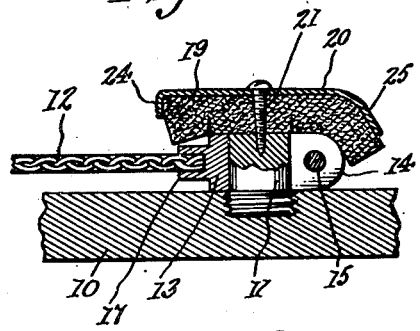
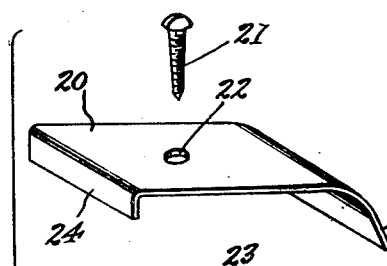
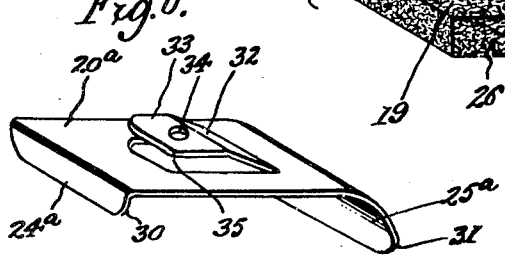
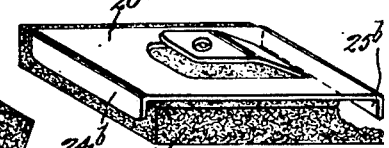
INVENTOR.
Emil R. McMorris
BY
Mawhinney & Mawhinney
Attorneys Patented Aug. 2, 1949

2,477,759

UNITED STATES PATENT OFFICE 2,477,759

BATTERY CORROSION ELIMINATOR

Emil R. McMorris, Coral Gables, Fla., assignor to Lee Gebhart, Coral Gables, Fla.

Application September 14, 1945, Serial No. 616,283

4 Claims. (Cl. 173—259)

The present invention relates to improvements in battery corrosion eliminators and more specifically to a device used in connection with automobile and like batteries for the purpose of anticipating and preventing the formation of corrosion in and about the terminal posts and cable clamps of such batteries.

It is well known that the electrolytic and electrical actions and discharges of wet batteries of this type are attended in use with the rather rapid and ravaging formation and accumulation of corrosion in and around the connections made between the cable clamps and battery posts or terminals; and that these formations and incrustations are attended with adverse effects in the transmission of electric current to the starting motors, in the rapid deterioration of both battery posts and clamps and secondarily in poor service in starting the internal combustion engines.

These accretions are also responsible for sharp impairment in the life of the battery and the frequent scraping and cleaning to remove such accumulations is an expensive nuisance to motorists and others using this type of battery.

While many efforts have been heretofore made to remedy this situation such attempts have heretofore failed to provide a suitable commercial article of a simplicity and economy of construction that recommends itself alike to manufacturers and purchasers and such is the general aim, object and purpose of the present invention.

The invention has for its further purpose to produce a form of device which will clamp an anti-corrosion grease absorbent pad in common to the terminal and clamp of a wet electric battery in such a manner that the pad will not only be compressed over corrosion-exposed surfaces of both of these connections but will also be confined and compressed to a predetermined form which will cooperate with the standard conformation of the parts of the posts and clamps to the end that greater perfection is achieved in the application of the grease or oil to such exposed surfaces in a manner to better repress the development of corrosion.

The invention has for a further object to provide an improved form of absorbent pad capable of conforming more accurately to the surfaces to be protected.

A still further object of the invention is to provide an improved combination of absorbent pad and backing plate in which the backing plate while compressing the absorbent pad molds the same tightly and snugly to the exposed surfaces to be protected.

A still further object of the invention is to provide an improved combination of absorbent pad, backing plate and single screw or nail fastening adapted to pass more or less centrally successively through the plate and pad in position to enter the upper or exposed end of the battery post.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary perspective view of an electric wet battery showing applied thereto an improved corrosion eliminator as constructed in accordance with the present invention.

Figure 2 is a fragmentary vertical section taken on an enlarged scale through a portion of the battery, one of its posts and cable clamp and showing the improved eliminator as applied thereto in an initial manner.

Figure 3 is a similar view showing the fastening driven home and the absorbent pad in the final compressed and conforming position.

Figure 4 is a perspective view of the parts of the combination disassembled.

Figure 5 is a perspective view of a nail fastening element that may be employed.

Figure 6 is a perspective view of spring-tongue form of backing plate.

Figure 7 is also a perspective view of another form of the plate and pad in which the pad is without notches and the plate is similarly flanged at both ends.

Referring more particularly to the drawings 10 designates generally an electric wet battery of the type presently employed in automobiles and 11 are the upstanding positive and negative battery posts adapted to receive the clamps 13 carried upon the ends of the flat or other flexible cables 12.

In accordance with the present conventional construction the clamps are in the form of rings which are split at one side. Outwardly projecting perforated lugs 14 on the free ends of the split ring are adapted to receive the clamp bolt 15 by which the free ends of the split ring are drawn together to contract the ring firmly about the post 11 to form good electrical contact and one which will resist the loosening effects of automobile vibration incident to travel.

It will also be noted that the conventional lugs 14 have rounded edges 16. At the opposite ends the split clamp rings are formed with outwardly projecting cable sockets 17. These sockets are reduced in a vertical sense comparatively to the clamps 13 of which they are integral parts, with the result that shoulders 18 are formed between these parts.

The improved device comprises an absorbent pad 19, preferably of felt, a backing plate 20 of some rigid material such as metal, and a single screw 21, such as a tapering metal screw. This screw is adapted to pass through perforations 22 and 23 made in the plate 20 and pad 19 respectively. The metal plate 20 is formed along one edge with a right angular down-turned flange 24 of rather shallow depth and at its opposite edge such backing plate is rolled downwardly and outwardly to provide the curved skirt 25 which preferably extends down substantially below the lower edge of the flange 24. In the bottom surface of the felt pad 19 are V-shaped notches 26 and 27 made suitable distances both from the transverse center line of the pad and from the opposite edges thereof for a purpose later described.

In the use of the device, the method of application is indicated generally in Figure 2 in which the felt pad, after being saturated or impregnated with motor lubricating oil, either light or heavy, is seated with its notched base resting upon the top ends of a battery post 11 and cable clamp 13. The plate 20 is before or afterwards placed over the upper surface of the absorbent pad 19 with the flange 24 and skirt 25 oriented as indicated. The screw passes through the plate and pad and is of sufficient length to penetrate the central portion of the battery post 11, it being noted that the free small diameter end of the tapering screw engages this soft metal.

The tapering screw is rotated to cause it to enter further downwards into the post 11 until it reaches a final position which is that indicated generally in Figure 3, in which the pad 19 is compressed to its final position. The descending backing plate 22, urged downwardly by the screw 21, the head of which is larger than the perforation 22, causes the compression of the pad 19 against the upper ends of the battery post and cable clamp. The forces of compression tending to squeeze the pad are attended by a horizontal or lateral extension of the pad. In this extension the plate 20 does not interfere so far as a spreading of the pad 19 is concerned in directions at right angles to the flange 24 and skirt 25. However in the other two directions the flange and skirt exercise inhibitory action; these actions are not the same.

The short right angular flange 24 abruptly and effectively checks all horizontal spreading of the pad 19 cableward except possibly for those forces in the lower portion of the pad developed below the short flange 24 but these forces are rather effectively checked by the restraint put upon the upper zone of the pad which is in direct line with the flange 24. The net result is that the portion of the pad 19 which lies between the shoulder 18 and the flange 24 expands vertically and binds down tightly upon the clamp adjacent the shoulders.

At the other end the skirt 25 exercises a more mild restraint upon the pad permitting of a certain elongation by compressing the pad between the incurved portion of the skirt 25 and the curved portions 16 of the lugs 14. The pad is also at this end forced between the lugs and toward the bolt.

The horizontal compression of the pad also closes the notches 26 and 27 which take up some of the horizontal compression. The notch 26 being located at or adjacent the shoulder 18 further induces the vertical expansion of the pad beyond such shoulder as shown in Figure 3. The other notch 27 located above the lugs is conducive to the bending of the lower edge of the pad about the curved surfaces 16 of the lugs.

The single screw of the tapering form presents a wedge action to the battery terminal 11 tending to spread the same out radially into a better contact with the internal cylindrical wall of the clamp 13, thus insuring a good electrical contact. The single screw is also preferable over a plurality of fastenings in that such single fastening at a central point upon a rigid backing plate pressing upon a compressible and flexible pad has the effect of swivelly connecting the plate with the battery post in such a manner that the plate may incline or tilt or gyrate in its descending movement on the pad in obedience to forces set up and developed in the pad locally resisting such descending and compressing movement of the plate.

This results in a compensating action which causes the pad to assume a uniformly compressed condition throughout all surface areas of the parts with which the pad comes in contact, and this pad is sufficiently wide to extend beyond the clamp at both sides and both ends of the clamp as shown in Figures 2 and 3. A pad of such dimensions has an absorbent capacity for oil or grease to enable it to retain quantities which will endure for long periods of time without further attention, particularly when the lower surface of the pad is bound so tightly to the battery terminal and clamp. It will be understood that the felt pad contains capillary passages for the absorption of the oil and for its exudation upon the battery parts by the capillary action due to exhaustion of the grease from the surfaces to be protected.

Referring more particularly to Figure 5 a hardened nail 21ᵃ may replace the screw 21 if desired. The shank of the screw or nail will preferably have a rather loose fit in the perforation 22 to allow the free movement of the plate 20 thereon.

Referring more particularly to Figure 6 a preferred form of backing plate 20ᵃ is shown made of resilient metal having the flange 24ᵃ at one end with preferably curved corners 30, and with the skirt 25ᵃ at its opposite end having the rounded corners 31.

In this instance a spring tongue is punched or cut from the resilient body of the plate 20ᵃ and sprung upwardly into the position substantially as shown with the tongue made from a diagonal section 22 and a flat section 33. In the flat section is a perforation 34 for a nail 21ᵃ or screw 21. Rounded edges 35 are made to reduce sharp corners and to improve the appearance of the article. The body of the plate may be incised or punched along opposite sides of the tongue and crosswise at one end thereof leaving the other end only attached integrally to the plate 20ᵃ. Thus the lower edge of the diagonal section 32 which forms a hinge or line of flexure about which the tongue is adapted to move or rotate.

This form of the invention operates in the following manner and has the following advantages.

The nail 21ᵃ or screw 21 is fitted through the perforation 34 and through the absorbent pad, being driven into the central portion of the battery post 11. Such fastening may be driven to any degree of penetration of the post 11 desired. As the head of the fastening moves down it tends to pull down the spring tongue 32, 33. The downward movement of the spring tongue in turn tends to push down the backing plate 20ª and sequentially to downwardly compress the pad 26. Thus constant spring pressure is brought to bear against the battery post and the cable terminal.

The boys employed at gasoline service stations do not always set the clamps 13 down flush with the tops of the battery posts 11. The familiar practice is to hammer the clamp rings downwardly over the posts and then to guide up on the bolts 15. However careless attendants very often neglect to drive the clamps down into the flush position so that clamps very often project above the tops of the battery posts. With the form of invention shown in Figure 4 it would be necessary to employ a longer screw or nail in such cases but the spring tongue of Figure 6 provides sufficient flexibility to take up this variation with a short length screw or nail.

The form of Figure 6 also provides additional area of exposed felt for more thoroughly and quickly absorbing of oil or periodical oilings.

The Figure 6 form also provides a simple method of removing the corrosion eliminator from the battery by simply downwardly compressing the spring clip or tongue 32, 33 as with the thumbnail, and then tapping the nail 21ª lightly sideways with a hammer. This form of the invention also eliminates the possibility of exerting too much pressure on the pad, thus squeezing oil from the pad.

A suitable motor or other oil or a grease may be used to impregnate the pad 19. In other words any of the well known corrosion inhibitors may be employed.

It will be appreciated that the invention achieves a single commercial device adapted to fit the various sizes of battery cable heads.

Referring more particularly to Figure 7 which shows an important form of the invention, it will be noted that the absorbent pad 26ᵇ is without the notches 26 and 27 and presents a completely uniform lower surface to the battery post and terminal clamp.

The plate 20ᵇ is also modified that instead of the skirt 25 downturned flanges 24ᵇ and 25ᵇ are provided for taking against opposite end portions of the absorbent pad 26ᵇ. In this instance the downturned flange 25ᵇ, which is preferably disposed at approximately right angles to the plane of the metallic plate 20ᵇ acts to arrest any endwise expansion of the absorbent pad which lies within the horizontal confines of the plate but the two flanges 24ᵇ and 25ᵇ, being preferably somewhat shorter than the depth of the pad permit the felt or other material to mushroom out below the flanges in the endwise horizontal expansion of the pad due to the downward pressure exterted by the backing plate 20ᵇ. This insures a more open condition of the pores or capillary passages of the pad and thus better insures the application of the oil or grease to the parts that are apt to be affected with the corrosion.

Also the form of the plate shown in Figures 6 and 7 with the upwardly sprung tongue has the further advantage in that there is exposed from above a central section of the pad for additional re-oiling without requiring removing of the devices from the battery. Oil may be simply poured upon the exposed section of the pad.

A great advantage of the device according to the invention is that it makes it possible to easily remove the battery cable terminal from the battery post. This is so because the oil surface prevents the accumulation of corrosion. Where corrosion sets in, it acts after the manner of a welding process as between the terminal and post; so much so that frequently where corrosion has set in badly an attendant will be obliged to use a hammer to pound the post or the terminal in an effort to loosen it. This pounding on the post frequently results in shattering the plates inside the battery. Such shattering ultimately makes the battery "go dead," and in any event will shorten the life of the battery considerably.

Corroded terminals inevitably prevent a fully charged battery from delivering its full efficient load of current to the starter.

A corroded terminal may cause the burning out of a car's lighting system, or the sudden, unexplanable stalling of a motor on the road because corrosion has reached such a point that there is no battery charge whatsoever being delivered. In other words all electrical contact is broken.

The elimination of corrosion around the terminal head also naturally results in reduced costs by avoiding replacement of the battery cables. Battery cables frequently have to be replaced, not only because of corrosive action, but because when corrosion sets in heavily the pounding of the terminal when connected with the battery post frequently damages the same, putting them badly out of shape and sometimes resulting in severing the woven wired connection to the terminal head.

Also when a terminal head is badly corroded to the post, and this sort of "corrosion welding" takes place, it usually affects the bolt which holds the terminal to the post. This bolt is designed to tighten the terminal around the post and when serious corrosion is evident trouble is experienced in releasing the bolt. If the bolt cannot be released to allow a certain amount of spread in the terminal, then it is necessary to take a screw driver or some other tool to force it upward to effect release. This also tends in many cases to put such upward lifting pressure on the battery post as that the battery plates are shattered or otherwise injured internally in the same fashion that pounding will do. In many cases posts are actually broken and the top cell covers of the battery are broken.

It is obvious that various changes and modifications may be made in the details of construction and design of the above specifically described embodiment of this invention without departing from the spirit thereof, such changes and modifications being restricted only by the scope of the following claims:

What is claimed is:

1. A battery corrosion eliminator comprising a resilient backing plate having an opening therethrough, an absorbent pad for a corrosion inhibitor having an opening therethrough, both of said openings being in axial alignment, a fastening passing through the plate and pad by said openings, said resilient backing plate extending over said absorbent pad for the entire length thereof affording a positive gripping action, and resilient means reacting on said fastening and plate to resiliently urge the plate against the pad.

2. For use with a battery having upstanding terminal posts a battery corrosion eliminator comprising a resilient backing plate having an opening therethrough, one end of said resilient backing plate being bent at substantially a right angle at one end and the other end of said backing plate bent in a curved downturned skirt, an absorbent pad for a corrosion inhibitor having an opening therethrough, both of said openings being in axial alignment, a fastening passing through the openings of said plate and pad and adapted to be urged into and retained within said upstanding terminal post, and resilient means reacting on said fastening and plate to resiliently urge the plate against the pad.

3. A battery corrosion eliminator comprising a resilient backing plate, a resilient tongue struck from said backing plate and having an opening therethrough and being connected to said backing plate at one end only, said tongue being bent therefrom obliquely and parallel to said plate, an absorbent pad for a corrosion inhibitor placed against the under surface of said plate and having an opening therethrough, said openings being coaxial, and fastening means passing through the openings in said backing plate and pad.

4. For use with a battery having an upstanding terminal post a battery corrosion eliminator comprising a resilient backing plate having an opening therethrough, and absorbent pad for a corrosion inhibitor having an opening therethrough, both said openings being in axial alignment, one end of said resilient backing plate being bent at substantially right angle and the other end of said backing plate being bent in a curved down turned skirt, the area surrounding the opening in said backing plate being in the form of a resilient tongue one end of which is connected to said backing plate, and retaining means passing through said openings and adapted to be retained within said upstanding terminal post.

EMIL R. McMORRIS.

REFERENCES CITED

The following references are of record in the file of this patent:

UNITED STATES PATENTS

| Number | Name | Date |
|---|---|---|
| 1,661,854 | Ridgely | Mar. 6, 1928 |
| 1,796,156 | McMorris | Mar. 10, 1931 |
| 1,800,756 | Sass | Apr. 14, 1931 |
| 1,807,410 | Hubbard | May 26, 1931 |
| 1,822,744 | Otwell | Sept. 8, 1931 |
| 1,882,587 | Heatwole | Oct. 11, 1932 |
| 1,922,077 | Buchanan | Aug. 15, 1933 |
| 2,145,135 | Ryalls | Jan. 24, 1939 |

OTHER REFERENCES

Page 131 of Popular Science for September 1943.